(12) United States Patent
Gatchalian et al.

(10) Patent No.: US 12,242,630 B2
(45) Date of Patent: Mar. 4, 2025

(54) MUTUAL TRANSPORT LAYER SECURITY (TLS) VERIFICATION USING AN AUTHORIZED VIEWER

(71) Applicant: Bank of America Corporation, Charlotte, NC (US)

(72) Inventors: Gilbert Gatchalian, Union, NJ (US); Kamal D. Sharma, Mason, OH (US); Karthik Rajagopalan, Richmond, VA (US); Kevin A. Delson, Woodland Hills, CA (US); Robert R. Rosseland, Charlotte, NC (US); Yassine Touahri, Charlotte, NC (US); Amer Ali, Jersey City, NJ (US); Jyothishwar Reddy Sama, Charlotte, NC (US); Srinivasulu Bodapati, Hyderabad (IN); Brian Christman, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 355 days.

(21) Appl. No.: 17/946,159

(22) Filed: Sep. 16, 2022

(65) Prior Publication Data
US 2024/0095383 A1  Mar. 21, 2024

(51) Int. Cl.
*G06F 21/62* (2013.01)
*G06F 21/55* (2013.01)
*G06F 21/60* (2013.01)

(52) U.S. Cl.
CPC ........ *G06F 21/6218* (2013.01); *G06F 21/554* (2013.01); *G06F 21/602* (2013.01)

(58) Field of Classification Search
CPC ... G06F 21/6218; G06F 21/554; G06F 21/602
See application file for complete search history.

(56) References Cited

U.S. PATENT DOCUMENTS

| | | | |
|---|---|---|---|
| 11,258,884 B1* | 2/2022 | Reiner | H04L 67/01 |
| 2007/0150965 A1* | 6/2007 | Redlich | G06F 21/6209 380/284 |
| 2021/0273949 A1* | 9/2021 | Howlett | H04L 63/1416 |
| 2021/0344573 A1* | 11/2021 | McGrew | H04W 12/12 |
| 2022/0329628 A1* | 10/2022 | Zayats | C07K 16/2809 |
| 2023/0198958 A1* | 6/2023 | Haddad | H04L 9/3226 713/160 |
| 2023/0198969 A1* | 6/2023 | Joshi | H04L 63/0471 726/1 |
| 2023/0353606 A1* | 11/2023 | DiPaulo | G10L 15/08 |

* cited by examiner

*Primary Examiner* — Linglan Edwards
*Assistant Examiner* — Kamryn J Gillespie
(74) *Attorney, Agent, or Firm* — Weiss & Arons LLP

(57) ABSTRACT

Methods are provided to secure a mutual Transport Layer Security (TLS) verification between a client computer and a server computer, using an authorized viewer. Methods may include intercepting a file at the authorized viewer. Methods may include using a content inspection Artificial Intelligence (AI) module to inspect the data. Methods may include preventing the transmission of malicious data to a server computer.

20 Claims, 7 Drawing Sheets

MUTUAL TRANSPORT LAYER SECURITY (TLS) VERIFICATION USING AN AUTHORIZED VIEWER

FIELD OF TECHNOLOGY

The field of technology relates to transfer of data between a client and a server.

BACKGROUND OF THE DISCLOSURE

In many entities it may be desirable to transfer files from a client computer to a server computer. Files coming from client computers may include data that may be infected with malware, viruses, ransomware, or any other malicious data. In other circumstances, data included in the client files may not be infected with malicious data. Many entities may have security verification applications on their computing devices to ensure secure transfer of data. Many entities may use a Transport Layer Security (TLS) protocol to ensure the secure transfer of data.

The TLS protocol may require the exchange of keys between the client computer and the server computer in order to initiate a TLS connection. Because the TLS protocol requires the exchange of keys, data transferred between two computing devices using a TLS protocol may not be inspected, unless the keys are accessible to both the entity performing the inspection, and the client sending the file. Therefore, securing a TLS connection is limited to authorized parties.

Current proxy solutions for securing a TLS connection may require that the proxy has access to a server private key or a client private key. However, with increasing frequency, entities are insisting on using their own private keys that cannot be shared with clients.

As such, it may be desirable to provide a system for security verification using an authorized viewer It would be further desirable to prioritize which files should be content inspected first. The prioritizing may allow for important and time sensitive data to be transmitted to the server computer quicker. The prioritizing may give precedence to bigger clients.

Furthermore, it would be desirable to provide a system that can identify malicious data. Malicious data may be identified through content inspection. Malicious data may be masked. Malicious data may be deleted. The authorized viewer may stop a transmission of a file containing malicious data.

SUMMARY OF THE DISCLOSURE

Systems, apparatus, and methods for securing a mutual Transport Layer Security (TLS) verification between a client computer and a server computer, using an authorized viewer. Methods may include sending a file from the client computer to the server computer. The file may be a file for receiving at the server computer. The file may be a registration file, a payment file, or any other suitable file.

Methods may include intercepting the file at an authorized viewer. The authorized viewer may be an MTLS authorized viewer. The file may contain a first encryption key message. The first encryption key message may contain a first public encryption key. The file may be encrypted with the first public encryption key.

The MTLS authorized viewer may store the first public encryption key, that was included in the first encryption key message. The MTLS authorized viewer may store the first public encryption key at a memory location associated with the MTLS authorized viewer.

The MTLS authorized viewer may generate a second public encryption key. The MTLS authorized viewer may store the second public encryption key at the memory location associated with the MTLS authorized viewer. The MTLS authorized viewer may transmit a second encryption key message to the server computer. The second encryption key message may include the second public encryption key.

The MTLS authorized viewer may initiate a first TLS connection with the client computer. The first TLS connection may be initiated using the first public encryption key.

The MTLS authorized viewer may initiate a second TLS connection with the server computer. The second TLS connection may be initiated using the second public encryption key.

The MTLS authorized viewer may be instantiated between the client computer and the server computer. This may allow the MTLS authorized viewer to initiate a MTLS connection between the client computer and the server computer, without the exchange of private keys. The client computer may not be aware of the MTLS authorized viewer. The MTLS authorized viewer may allow data to be decrypted by a third party for the purpose of content inspection. This may increase the safety of client, server file transfers.

The MTLS authorized viewer may decrypt the file, received from the client computer. The MTLS authorized viewer may decrypt the file using the first public encryption key. The MTLS authorized viewer may transmit the decrypted file to a content inspection Artificial Intelligence (AI) module for content inspection.

The content inspection AI module may inspect the data included in the decrypted file. The content inspection AI module may inspect the data using a predetermined standard of security verification. The predetermined standard of security verification may be determined by using AI to determine a threshold level of security verification. The threshold level of security verification may be based on an objective standard for identifying malicious data. Data that does not achieve the predetermined standard of security verification may be flagged as malicious. Data that achieves the predetermined standard of security verification may be marked as clean.

The content inspection AI module may analyze the data. The data may be analyzed using the predetermined standard of security verification. The content inspection AI module may flag the data as malicious if the data fails to achieve the predetermined standard of security verification. The flagging may convert the data into flagged data.

The content inspection AI module may flag the data by tagging the metadata of the data. If the data fails to achieve the predetermined standard of security verification, the content inspection AI module may tag the metadata as malicious.

The content inspection AI module may mark the data as clean if the data achieves the predetermined standard of security verification. The marking may convert the data into marked data.

The content inspection AI module may mark the data by tagging the metadata of the data. If the data achieves the predetermined standard of security verification, the content inspection AI module may tag the metadata as clean.

The content inspection AI module may analyze the data included in the file. The content inspection AI module may use AI to recognize patterns within the data. The content inspection AI module may inspect the data for anomalies within the patterns of the data. The content inspection AI module may flag data associated with the anomalies in the data. The content inspection AI module may flag the data associated with the anomalies in the data by tagging the metadata.

The content inspection AI module may transmit the data to the MTLS authorized viewer. The content inspection may transmit flagged data to the MTLS authorized viewer. The content inspection AI module may transmit marked data to the MTLS authorized viewer.

The MTLS authorized viewer may mask data included in the file. The masking may include allowing deactivation of the malicious data. Deactivating the malicious data may prevent malicious activity from occurring on the server computer. The masked data may be flagged data. The flagged data may be masked to prevent malicious data from infiltrating the server computer.

The MTLS authorized viewer may delete data included in the file. The deleted data may be flagged data. The flagged data may be deleted in order to prevent malicious data from infiltrating the server computer.

The MTLS authorized viewer may stop the transmission of a file to the server computer. The file may include flagged data. The MTLS authorized may stop the transmission of a file in order to prevent malicious data from infiltrating the server computer.

The MTLS authorized viewer may re-encrypt the remaining data of the file. The MTLS viewer may use the second encryption key to re-encrypt the file. The MTLS viewer may retrieve the second public encryption key from the memory location associated with the MTLS authorized viewer.

The MTLS authorized viewer may transmit the re-encrypted file to the server computer. The server computer may receive the file from the MTLS authorized viewer. The server computer may decrypt the file using the second public encryption key.

The methods further comprise sending a plurality of files from the client computer. The files may be for receiving by the server computer. The MTLS authorized viewer may intercept the plurality of files. The MTLS authorized viewer may use AI to prioritize the files according to a discrete prespecified prioritization value, associated with each of the files. The files may be prioritized based on the destination the file is going to, the client the file is coming from, the type of file, or any other suitable prioritization value.

The MTLS authorized viewer may transmit the plurality of files to a content inspection AI module. The files may be transmitted in the order of the prespecified prioritization value. The content inspection AI module may flag files as malicious that fail to achieve a predetermined standard of security verification. The content inspection AI module may mark data as clean that achieve a predetermined standard of security verification.

The content inspection AI module may transmit the plurality of files to the MTLS authorized viewer. The content inspection AI module may transmit flagged files to the MTLS authorized viewer. The content inspection AI module may transmit marked files to the MTLS authorized viewer.

The MTLS authorized viewer may delete one or more of the plurality of files. The files may be flagged files. The MTLS authorized viewer may delete the files in order to prevent malicious data from infiltrating the server computer.

The MTLS authorized viewer may stop the transmission of one or more of the plurality of files. The files may be flagged files. The MTLS authorized may stop the transmission of a file in order to prevent malicious data from infiltrating the server computer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
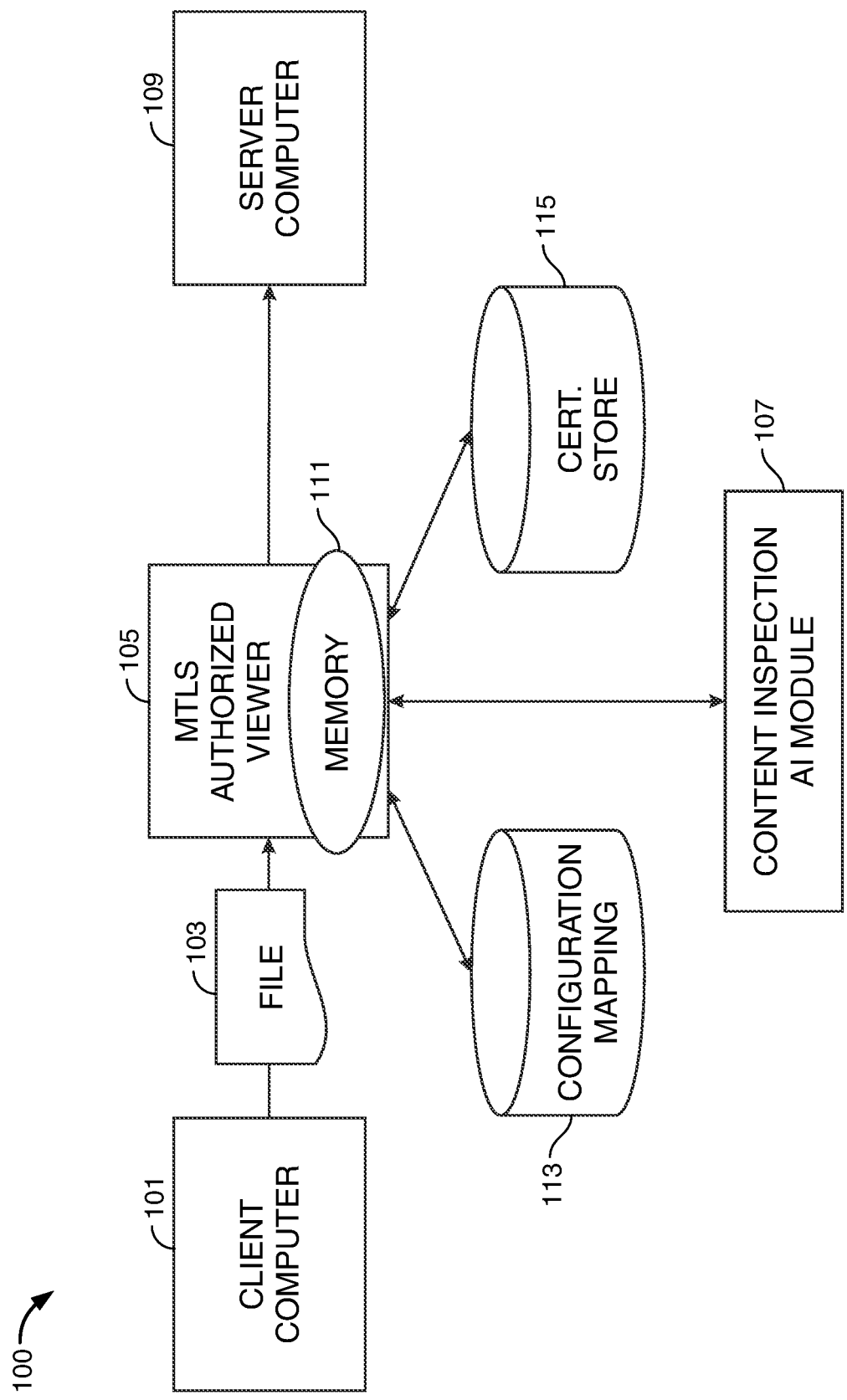
FIG. 1 shows an illustrative diagram in accordance with principles of the invention.

Apparatus, methods, and systems for securing a mutual Transport Layer Security (TLS) verification between a client computer and a server computer, using an authorized viewer.

An apparatus may include a Mutual TLS (MTLS) authorized viewer. The MTLS authorized viewer may be a computing device. The MTLS authorized viewer may be a desktop computer, laptop, tablet, or any other suitable computing device. The MTLS authorized viewer may be connected to the server computer. The connection may be through a network, such as a LAN, WAN, edge computing network, or any other suitable network. The connection may be through Ethernet or any other suitable connection cable.

The MTLS authorized viewer may include a memory location. The memory location may include ROM, RAM, and/or a secondary memory. The memory location may be used to store what is received by the MTLS authorized viewer.

The MTLS authorized viewer may further comprise a configuration mapping module. The MTLS authorized viewer may further comprise a certification storage module. The MTLS authorized viewer may further comprise a content inspection artificial intelligence (AI) module.

The MTLS authorized viewer may be configured to intercept a file being sent from a client computer to a server computer. The file may be a registration file, payment file, or any other suitable file. The file may contain a first encryption key message. The first encryption key method may contain a first public encryption key. The The MTLS authorized viewer may store the first public encryption key the memory location associated with the authorized viewer.

The MTLS authorized viewer may be further configured to generate a second public encryption key. The MTLS authorized viewer may transmit the second public encryption key to the server computer via a second encryption key message.

The MTLS authorized viewer may be further configured to initiate a first MTLS connection with the client computer. The MTLS authorized viewer may be configured to initiate a second MTLS connection with the server computer.

The MTLS authorized viewer may be further configured to decrypt the file using the first public encryption key. The first public encryption key may be retrieved from the memory location. The MTLS authorized viewer may transmit the decrypted file to the content inspection AI module.

The content inspection AI module may be configured to inspect the data included in the file based on a predetermined standard of security verification. The content inspection AI module may flag data, as malicious, that does not achieve the predetermined standard of security verification. The content inspection AI module may mark data, as clean, that achieves the predetermined standard of security verification.

The content inspection AI module may be further configured to analyze the data included in the file. The content inspection AI module may use AI to recognize patterns within the data. The content inspection AI module may inspect the data for anomalies within the patterns of the data. The content inspection AI module may flag data associated with the anomalies in the data.

The content inspection AI module may be further configured to transmit the flagged data to the MTLS authorized viewer. The content inspection AI module may be further configured to transmit the marked data to the MTLS authorized viewer.

The MTLS authorized viewer may be further configured to mask data flagged by the content inspection module. The MTLS authorized viewer may delete data flagged by the content inspection AI module. The MTLS authorized viewer may stop a transmission of a file containing flagged data. The MTLS authorized viewer may prevent malicious data from being transmitted to the server computer.

Apparatus may also include a low latency MTLS authorized viewer. The apparatus may comprise a MTLS authorized viewer. The MTLS authorized viewer may be a computing device. The MTLS authorized viewer may be a desktop computer, laptop, tablet, or any other suitable computing device.

The MTLS authorized viewer may be configured to receive a first encryption key. The first encryption key may be for decrypting a bidirectional stream of communication between a client computer and server computer. The MTLS authorized viewer may decrypt the bidirectional stream of communication. The MTLS authorized viewer may transmit files included in the bidirectional stream of communication to a content inspection AI module, for content inspection.

The content inspection AI module may be further configured to inspect the files included in the bidirectional stream of communication. The content inspection AI module may flag data included in the files that fails to achieve a predetermined level of security verification, as malicious. The content inspection AI module may mark data included in the files that achieves a predetermined level of security verification, as clean.

The content inspection AI module may be further configured to analyze the data included in the file. The content inspection AI module may use AI to recognize patterns within the data. The content inspection AI module may inspect the data for anomalies within the patterns of the data. The content inspection AI module may flag data associated with the anomalies in the data.

The content inspection AI module may be further configured to transmit the flagged data to the MTLS authorized viewer. The content inspection AI module may be further configured to transmit the marked data to the MTLS authorized viewer.

The MTLS authorized viewer may be further configured to mask data flagged by the content inspection module. The MTLS authorized viewer may delete data flagged by the content inspection AI module. The MTLS authorized viewer may stop a transmission of a file containing flagged data. The MTLS authorized viewer may prevent malicious data from being transmitted to the server computer.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative apparatus 100. Apparatus 100 may include client computer 101, server computer 109, and MTLS authorized viewer 105. MTLS authorized viewer 105 may also include memory 111, configuration mapping module 113, certification storage module 115, and content inspection AI module 107. Client computer 101 may send file 103. File 103 may be for receiving at server computer 109.

Client computer 101, server computer 109, and MTLS authorized viewer 105 may be computing devices. Computing devices may include a desktop, laptop, tablet, smart phone, or any other suitable computing device. Client computer 101, server computer 109, and MTLS authorized viewer 105 may be connected via LAN, WAN, an edge computing network, Ethernet, or any other suitable connection.

Illustrative apparatus 100 illustrates the transmission of file 103. Client computer 101 may send file 103 to server computer 109. MTLS authorized viewer 105 may intercept file 103.

Figure 2A:
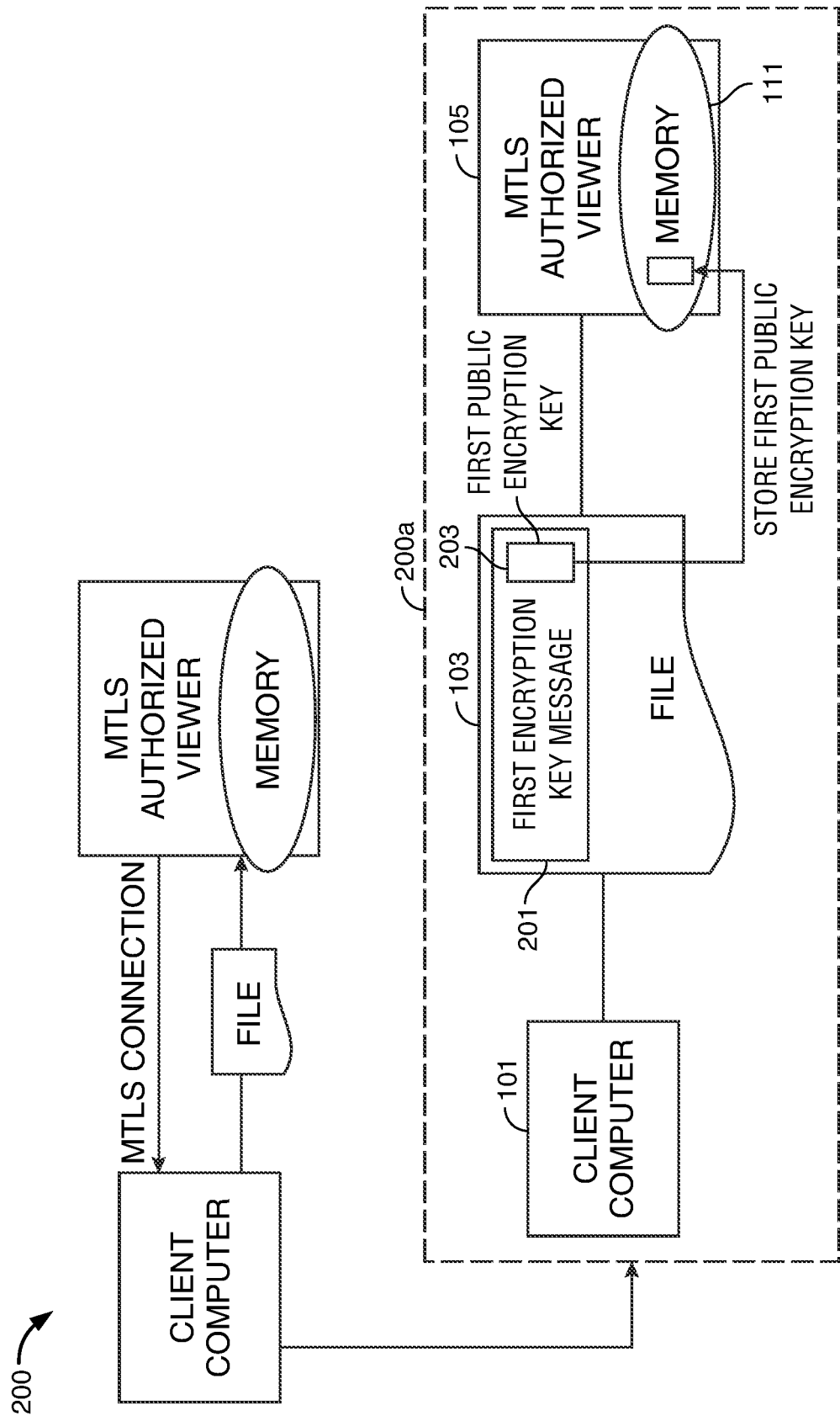
FIG. 2A shows the illustrative diagram of FIG. 1 in greater detail.

FIG. 2A shows illustrative process 200A. Illustrative process 200A demonstrates the process transpiring in apparatus 100. Client computer 101 may send file 103 to server computer 109 (shown in FIG. 1). File 103 may contain first encryption key message 201. First encryption key message 201 may include first public encryption key 203. File 103 may be encrypted using first public encryption key 203.

MTLS authorized viewer 105 may intercept file 103 before file 103 reaches server computer 109 (shown in FIG. 1). MTLS authorized viewer 105 may intercept first encryption key message 201. MTLS authorized viewer 105 may intercept first public encryption key 203. MTLS authorized viewer 105 may store first public encryption key 203 in memory location 111. Memory location 111 may be associated with MTLS authorized viewer 105.

Figure 2B:
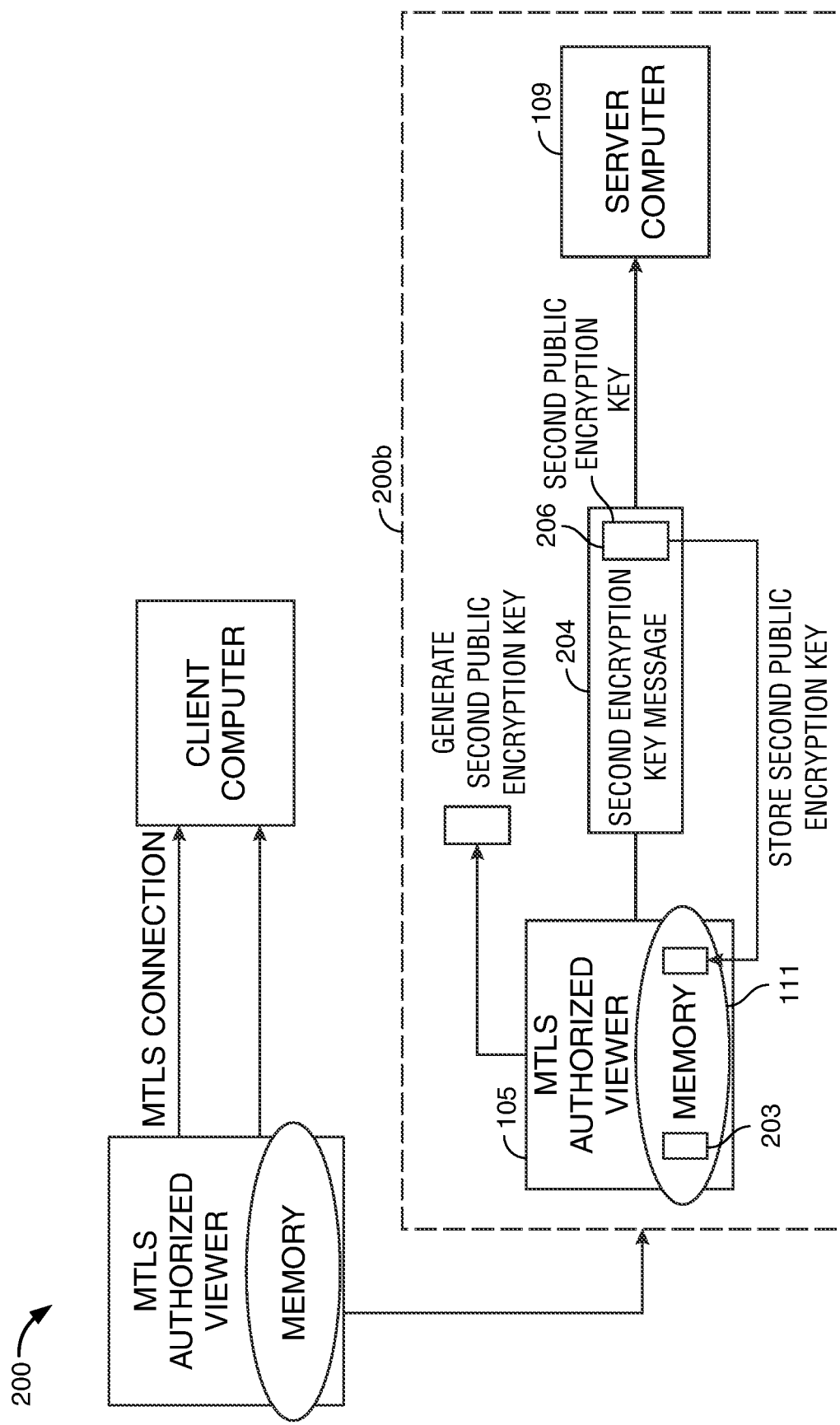
FIG. 2B shows the illustrative diagram of FIG. 1 in greater detail.

FIG. 2B shows illustrative process 200B. Illustrative process 200B demonstrates the process occurring in exemplary apparatus 100. MTLS authorized viewer 105 may generate second public encryption key 206. Second public encryption key 206 may be stored in memory location 111. Memory location 111 may store first public encryption key 203 and the second public encryption key 206. Memory location 111 may be associated with MTLS authorized viewer 105.

MTLS authorized viewer 105 may transmit second encryption key message 204 to server computer 109. Second encryption key message 204 may include second public encryption key 206. Server computer 109 may receive second encryption key message 204 with second public encryption key 206.

Figure 3:
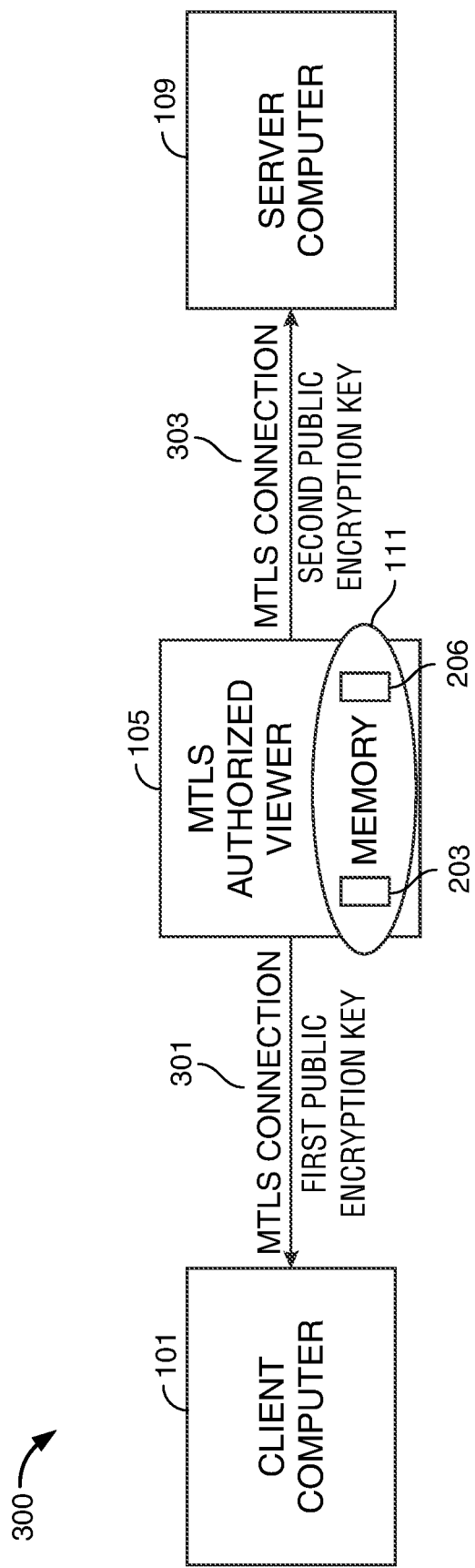
FIG. 3 shows another illustrative diagram in accordance with principles of the invention.

FIG. 3 shows illustrative process 300. MTLS authorized viewer 105 may initiate first MTLS connection 301 with client computer 101. First MTLS connection 301 may be initiated using first public encryption key 203. First public encryption key 203 may be retrieved from memory location 111.

MTLS authorized viewer 105 may initiate second MTLS connection 303 with server computer 109. Second MTLS connection 303 may be initiated using second public encryption key 206. Second public encryption key 206 may be retrieved from memory location 111.

Figure 4:
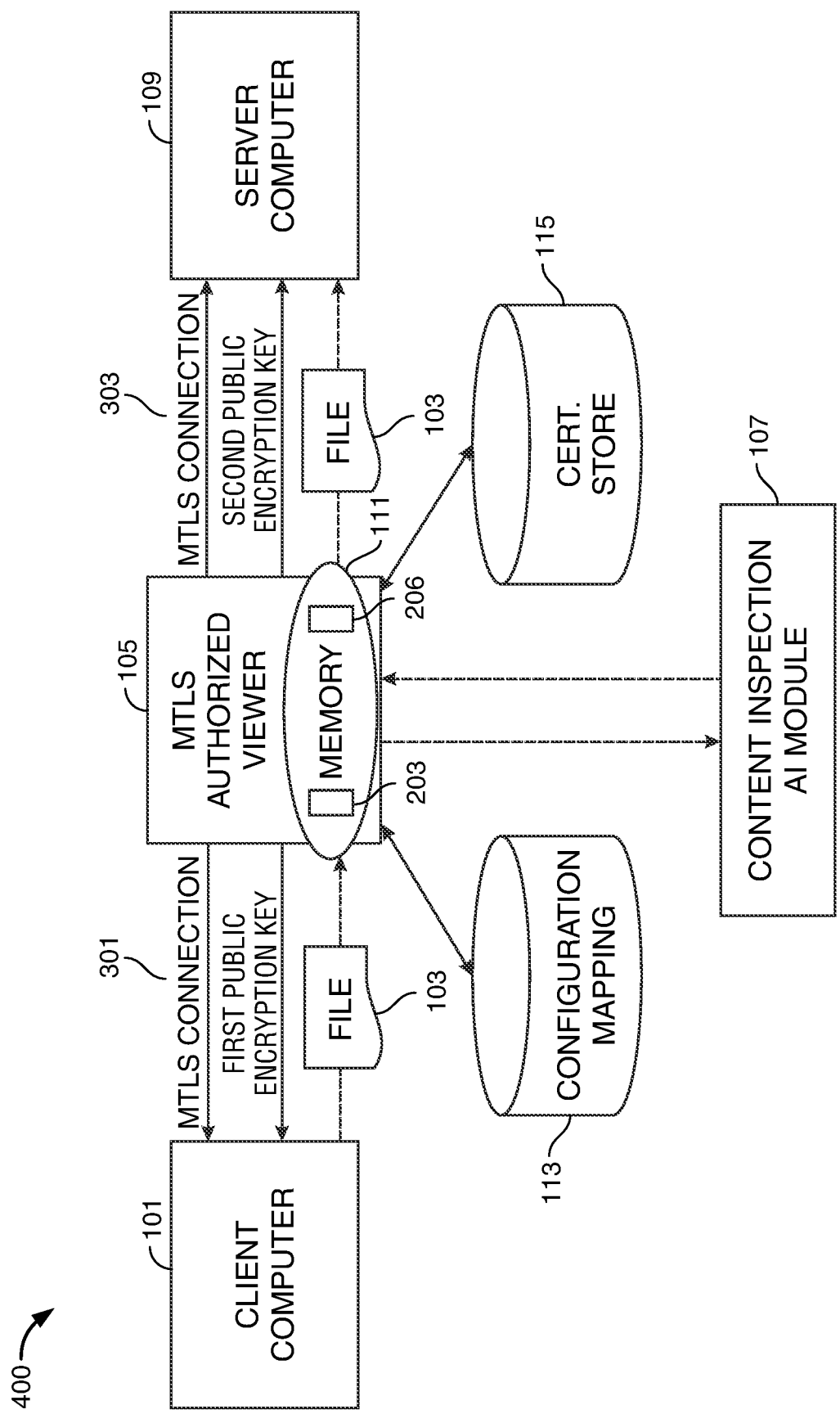
FIG. 4 shows still another illustrative diagram in accordance with principles of the invention.

FIG. 4 shows illustrative process 400. Process 400 may include decrypting file 103. File 103 may be decrypted using public first encryption key 203. First public encryption key 203 may be retrieved from memory 111.

MTLS authorized viewer 105 may transmit decrypted file 103 to content inspection AI module 107. Content inspection AI module 107 may inspect the data included in decrypted file 103. Content inspection AI module 107 may flag data as malicious. Content inspection AI module 107 may mark data as clean. Content inspection AI module 107 may transmit flagged data to MTLS authorized viewer 105. Content inspection AI module 107 may transit marked data to MTLS authorized viewer 105. MTLS authorized viewer 105 may mask flagged data. MTLS authorized viewer 105 may delete flagged data. MTLS authorized viewer 105 may stop the transmission of flagged data.

MTLS authorized viewer 105 may re-encrypt file 103. MTLS authorized viewer 105 may re-encrypt file 103 using second public encryption key 206. Second public encryption key 206 may be retrieved from memory location 111. MTLS authorized viewer 105 may transmit re-encrypted file 103 to server computer 109. Server computer 109 may decrypt file 103 using second public encryption key 206.

Figure 5:
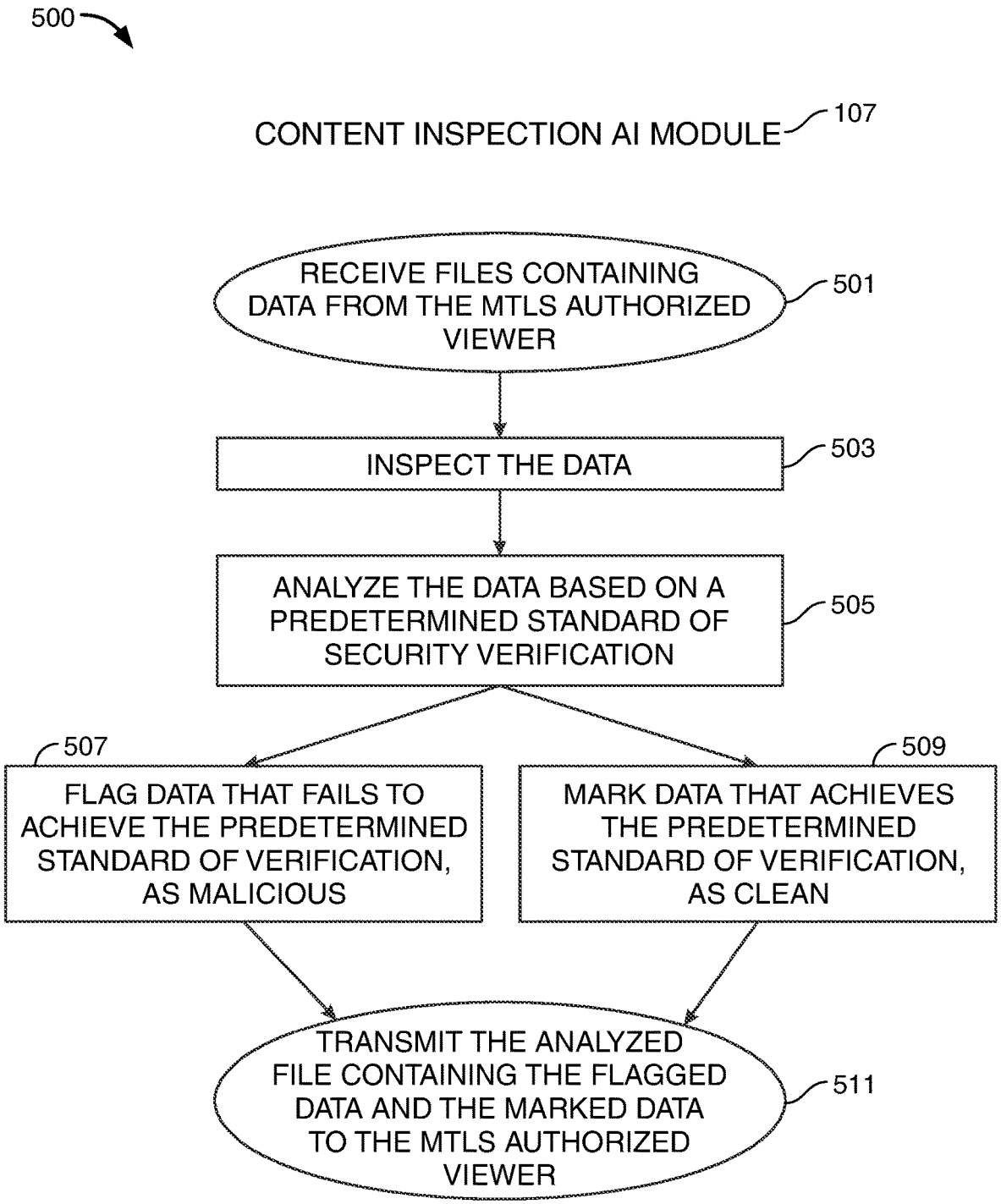
FIG. 5. still another illustrative diagram in accordance with principles of the invention.

FIG. 5 shows illustrative diagram of process 500. Process 500 shows the process for content inspection. Step 501 shows that content inspection AI module 107 may receive decrypted file 103 from MTLS authorized viewer 105 (shown in above FIGS). Step 503 shows the inspection of the data received in file 103. Step 505 shows content inspection AI module 107 may analyze the data based on a predetermined level of security verification. The predetermined level of security verification may be determined by using AI to define a threshold value of security verification. The threshold value of security verification may be determined using an objective standard of identifying malicious data. The data included in the file may be analyzed against the predetermined threshold value for security verification.

Step 507 includes identifying which data failed to achieve the predetermined standard of security verification. Step 507 further includes flagging the identified data as malicious. Flagging the data may include tagging the metadata of the data as malicious. Flagging the data may convert data into flagged data. Preferably simultaneously, step 509 includes identifying data that achieves the predetermined standard of security verification. Step 509 further includes marking the identified data as clean. Marking data may include tagging the metadata of the data as clean. Marking the data may convert the data into marked data.

Step 511 includes transmitting the flagged data to MTLS authorized viewer 105. Step 511 includes transmitting the marked data to authorized viewer 105.

Figure 6:
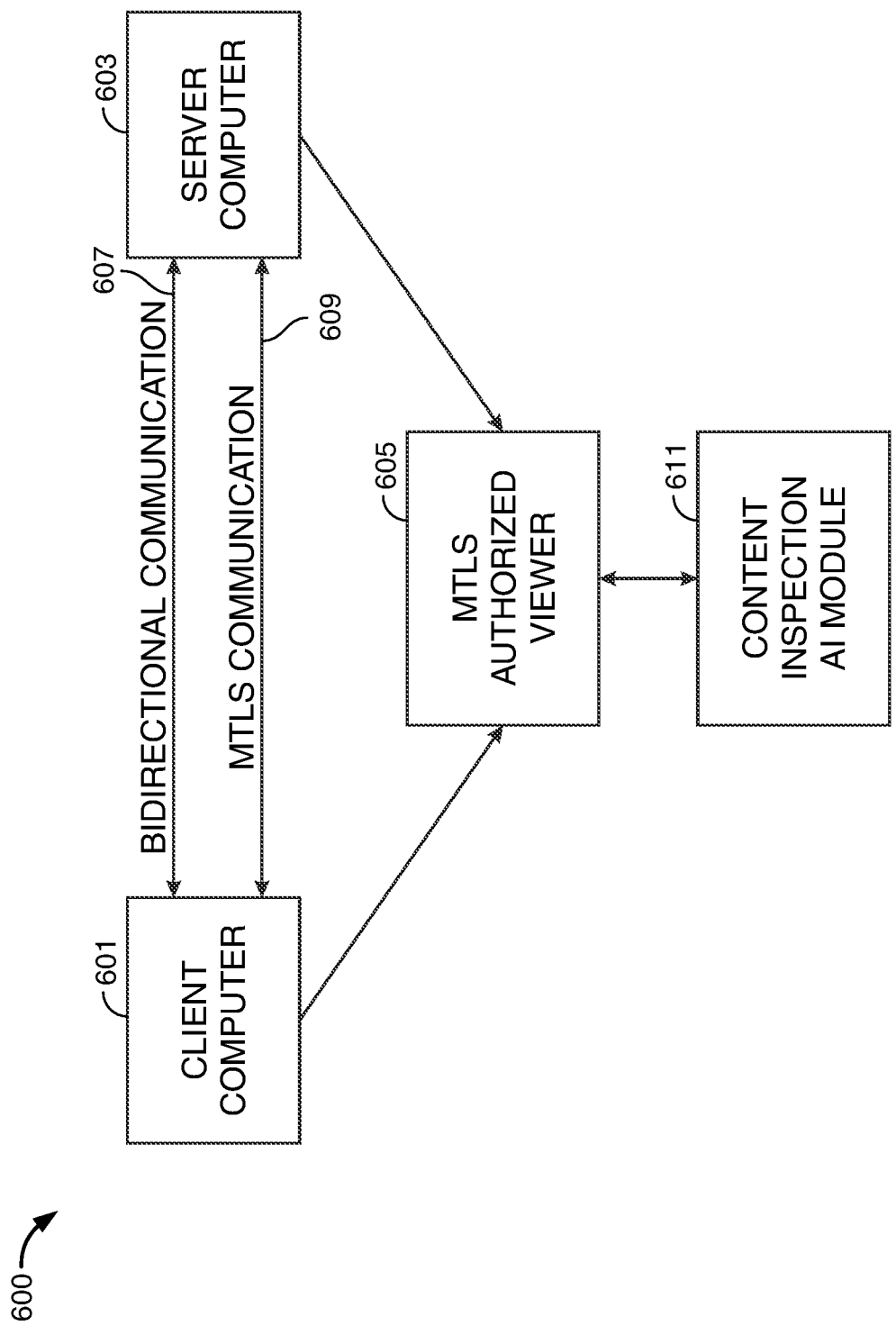
FIG. 6. shows still another illustrative diagram in accordance with principles of the invention.

FIG. 6 shows illustrative apparatus 600. Illustrative apparatus 600 shows a low latency system for securing an MTLS connection 609 using MTLS authorized viewer 605. MTLS authorized viewer 605 may receive a first encryption key (not shown). The first encryption key for decrypting a stream of bidirectional communication 607 between client computer 601 and server computer 603.

The stream of bidirectional communication 607 may include files being transmitted from client computer 601 to server computer 603. MTLS authorized viewer 605 may decrypt the stream of bidirectional communication 607 using the first encryption key. MTLS authorized viewer may transmit files, decrypted from the stream of bidirectional communication 607, to content inspection AI module 611.

Content inspection AI module 611 may inspect the data included in decrypted files. Content inspection AI module 611 may flag data, as malicious. Content inspection AI module 611 may mark data, as clean. Content inspection AI module 611 may transmit flagged data to MTLS authorized viewer 605. Content inspection AI module 611 may transit marked data to MTLS authorized viewer 605. MTLS authorized viewer 605 may mask flagged data. MTLS authorized viewer 605 may delete flagged data. MTLS authorized viewer 605 may stop the transmission of flagged data.

Thus, methods and apparatus for a MUTUAL TRANSPORT LAYER SECURITY (TLS) VERIFICATION USING AN AUTHORIZED VIEWER are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A file security verification apparatus, the apparatus comprising:
   a client computer;
   a server computer; and
   a mutual transport layer security (MTLS) authorized viewer, said authorized viewer configured to:
   intercept a first encryption key message from the client computer to the server computer, said first encryption key message containing a first public encryption key;
   store the first public encryption key at a memory location associated with the MTLS authorized viewer;
   generate a second public encryption key;
   store the second public encryption key at the memory location associated with the MTLS authorized viewer;
   send a second encryption key message to the server computer, said second encryption key message containing the second public encryption key;
   initiate a first MTLS connection with the client computer using the first public encryption key;
   initiate a second MTLS connection with the server computer using the second public encryption key;
   intercept a file from the client computer, said file being transmitted from the client computer to the server computer, said file encrypted with the first public encryption key;
   decrypt the file using the first public encryption key to form a decrypted file, said first public encryption key being retrieved from the memory location;
   transmit the decrypted file to a content inspection Artificial Intelligence (AI) module, for content inspection, said content inspection AI module configured to:
   receive a decrypted file from the authorized viewer;
   inspect the decrypted file;
   analyze the decrypted file, said analyzing based on a predetermined standard of security verification;
   flag data included in the file that fails to achieve the predetermined standard of security verification, as malicious, said flagging converting the data into flagged data;

mark data that achieves the predetermined standard of verification, as clean, said marking converting the data into marked data;

when the data is flagged data, transmit the flagged data to the authorized viewer; and when the data is marked data, transmit the marked data to the authorized viewer;

receive the decrypted file from the content inspection AI module, said file containing the flagged data or the marked data;

re-encrypt the file with the second public encryption key, said second public encryption key being retrieved from the memory location; and transmit the re-encrypted file to the server computer, said re-encrypted file being decryptable with the second public encryption key.

2. The apparatus of claim 1, wherein the MTLS authorized viewer is configured to mask data flagged by the content inspection AI module as failing to achieve the predetermined standard of security verification.

3. The apparatus of claim 1, wherein the MTLS authorized viewer is configured to delete data flagged by the contented inspection AI module as failing to achieve the predetermined standard of security verification.

4. The apparatus of claim 1, wherein the MTLS authorized viewer is configured to stop a transmission of the file when the data included in the file is flagged by the content inspection AI module as failing to achieve the predetermined standard of security verification.

5. The apparatus of claim 1, wherein the content inspection AI module is further configured to:
analyze the data contained in the file, the file received from the MTLS authorized viewer;
use AI to recognize patterns within the data;
inspect for anomalies in the pattern of the data; and
flag data associated with the anomalies.

6. The apparatus of claim 5, wherein the content inspection AI module is further configured to stop a transmission of a file that is flagged as being associated with the anomalies.

7. A low-latency file security verification apparatus, the apparatus comprising:
a client computer;
a server computer; and
a mutual transport layer security (MTLS) authorized viewer, said authorized viewer configured to:
receive a first encryption key, said first encryption key for decrypting a bidirectional stream of communication between the client computer and the server computer;
decrypt the bidirectional stream of communication between the client computer and the server computer to form decrypted files, said stream of communication including files being transferred from the client computer to the server computer;
transmit the decrypted files included in the bidirectional stream of communication to a content inspection AI module for content inspection, said content inspection AI module configured to:
receive the decrypted files from the authorized viewer;
inspect the decrypted files;
analyze the decrypted files, said analyzing based on a predetermined standard of security verification;
flag data included in the files that fails to achieve the predetermined standard of security verification, as malicious, said flagging converting the data into flagged data;

mark data that achieves the predetermined standard of verification, as clean, said marking converting the data into marked data, when the data is flagged data, transmit the flagged data to the authorized viewer; and when the data is marked data, transmit the marked data to the authorized viewer; and receive the files from the content inspection AI module.

8. The apparatus of claim 7, wherein the MTLS authorized viewer is configured to mask data flagged by the content inspection AI module failing to achieve the predetermined standard of security verification.

9. The apparatus of claim 7, wherein the MTLS authorized viewer is configured to delete data flagged by the content inspection AI module as failing to achieve the predetermined standard of security verification.

10. The apparatus of claim 7, wherein the MTLS authorized viewer is configured to stop a transmission of the files when the data included in the files is flagged by the content inspection AI module as failing to achieve the predetermined standard of security verification.

11. The apparatus of claim 7, wherein the content inspection AI module is further configured to:
analyze the data contained in the files, received by the MTLS authorized viewer;
use the AI module to recognize patterns within the data;
inspect for anomalies in the pattern of the data; and
flag data flag data associated with the anomalies.

12. The apparatus of claim 11, wherein the content inspection AI module is further configured to stop a transmission of a file that is flagged as being associated with the anomalies.

13. A method for security verification of a file being sent from a client computer to a server computer using a mutual transport layer security (MTLS) authorized viewer, the method comprising:
sending a first encryption key message from the client computer to the server computer, the first encryption key message containing a first public encryption key;
intercepting at the MTLS authorized viewer, the first encryption key message;
storing the first public encryption key at a memory location associated with the MTLS authorized viewer;
generating from the MTLS authorized viewer, a second public encryption key;
storing the second public encryption key at the memory location associated with the MTLS authorized viewer;
sending from the MTLS authorized viewer, a second encryption key message to the server computer, said second encryption key message containing the second public encryption key;
initiating a first MTLS connection with the client computer using the first public encryption key;
initiating a second MTLS connection with the server computer using the second public encryption key;
intercepting a file from the client computer, said file being transmitted from the client computer to the server computer, said file encrypted with the first public encryption key;
decrypting the file to form a decrypted file using the first public encryption key, the first public encryption key being retrieved from the memory location;
transmitting the decrypted file to a content inspection AI module, for content inspection;
receiving the file from the content inspection AI module, the file flagged as malicious or marked as clean;

re-encrypting the file with the second public encryption key, the second public encryption key being retrieved from the memory location; and transmitting the re-encrypted file to the server computer, said re-encrypted file being decryptable with the second public encryption key.

14. The method of using the content inspection AI module of claim 13, the method further comprising:

receiving the decrypted file from the authorized viewer;

inspecting the decrypted file;

analyzing the decrypted file, said analyzing based on a predetermined standard of security verification;

flagging data included in the file that fails to achieve the predetermined standard of security verification, as malicious, said flagging converting the data to flagged data;

marking data that achieves the predetermined standard of verification, as clean, said marking converting the data to marked data, when the data is flagged data, transmitting the flagged data to the authorized viewer; and when the data is marked data, transmitting the marked data to the authorized viewer.

15. The method of claim 13, the method further comprising, masking data flagged by the content inspection AI module as failing to achieve a predetermined standard of security verification.

16. The method of claim 13, the method further comprising, deleting data flagged by the content inspection AI module as failing to achieve a predetermined standard of security verification.

17. The method of claim 13, the method further comprising, stopping a transmission of a file that is flagged as failing to achieve a predetermined standard of security verification.

18. The method of claim 13, the method further comprising:

sending a plurality of files from the client computer to the server computer;

intercepting the plurality of files at the MTLS authorized viewer;

using AI to prioritize the files according to a discrete prespecified prioritization value, associated with each of the files;

transmitting the files to a content inspection AI module, the files transmitted in order of the discrete prespecified prioritization value; and the content inspection AI module flagging files as malicious that fail to achieve a predetermined standard of security verification or marking files as clean that achieves the predetermined standard of security verification.

19. The method of claim 18, the method further comprising, transmitting to the server computer, the plurality of files in order of the prespecified prioritization value.

20. The method of claim 18, the method further comprising stopping a transmission of one or more of the plurality of files if the one or more of the plurality of files fail to achieve the predetermined standard of security verification.

* * * * *